United States Patent
Park et al.

(10) Patent No.: US 12,555,816 B2
(45) Date of Patent: Feb. 17, 2026

(54) APPARATUS AND METHOD FOR FOLDING BATTERY CELL

(71) Applicant: LG Energy Solution, Ltd., Seoul (KR)

(72) Inventors: Ji Soo Park, Daejeon (KR); Dong Hyeuk Park, Daejeon (KR); Ju Hyung Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 685 days.

(21) Appl. No.: 17/666,977

(22) Filed: Feb. 8, 2022

(65) Prior Publication Data

US 2022/0255113 A1     Aug. 11, 2022

(30) Foreign Application Priority Data

Feb. 10, 2021   (KR) .......................... 10-2021-0019497

(51) Int. Cl.
*H01M 10/04*     (2006.01)
*H01M 10/613*    (2014.01)
*H01M 10/052*    (2010.01)

(52) U.S. Cl.
CPC ..... *H01M 10/0459* (2013.01); *H01M 10/613* (2015.04); *H01M 10/052* (2013.01)

(58) Field of Classification Search
CPC ......... H01M 10/0459; H01M 10/0404; H01M 50/105; H01M 50/166; B29C 66/4332; B29C 66/73921; B29C 66/1122; B29C 66/0342
See application file for complete search history.

(56) References Cited

U.S. PATENT DOCUMENTS

| | | | |
|---|---|---|---|
| 2007/0271878 A1* | 11/2007 | Hendriks | .................. B65B 9/20 |
| | | | 53/140 |
| 2020/0247569 A1* | 8/2020 | Chisholm | ............. B65B 7/2878 |
| 2022/0320565 A1* | 10/2022 | Jeong | ................ H01M 10/0481 |

FOREIGN PATENT DOCUMENTS

| EP | 3035432 A1 * | 6/2016 | ......... H01M 10/045 |
|---|---|---|---|
| JP | H07314550 A | 12/1995 | |
| JP | 2000191863 A | 7/2000 | |
| JP | 2000223083 A | 8/2000 | |
| JP | 2002331309 A | 11/2002 | |
| JP | 4114755 B2 | 7/2008 | |
| JP | 6126418 B2 | 5/2017 | |
| KR | 20080097731 A | 11/2008 | |
| KR | 20150035123 A | 4/2015 | |
| KR | 101533574 B1 | 7/2015 | |
| KR | 101603074 B1 | 3/2016 | |
| KR | 101699853 B1 | 1/2017 | |

(Continued)

*Primary Examiner* — Brian R Ohara
*Assistant Examiner* — Brent C Thomas
(74) *Attorney, Agent, or Firm* — Lerner David LLP (57) ABSTRACT

An apparatus for folding a battery cell according to an embodiment of the present invention may fold a sealing part of a pouch-type battery cell. The apparatus for folding the battery cell includes a base on which an accommodation part of the battery cell is seated, a guide protruding upward from each of both sides of the base to wrap the accommodation part at both sides, a pressing member configured to press the sealing part so that the sealing part is folded toward an outer surface of the guide, a heating member configured to heat the sealing part when the pressing member presses the sealing part, and a cooling member configured to inject cold air to the folded sealing part.

12 Claims, 7 Drawing Sheets

(56) References Cited

FOREIGN PATENT DOCUMENTS

| | | | |
|---|---|---|---|
| KR | 101820443 | B1 | 1/2018 |
| KR | 102088214 | B1 | 3/2020 |

\* cited by examiner

APPARATUS AND METHOD FOR FOLDING BATTERY CELL

CROSS-REFERENCE TO RELATED APPLICATIONS

This application claims the priority of Korean Patent Application No. 10-2021-0019497 filed on Feb. 10, 2021, in the Korean Intellectual Property Office, the disclosure of which is incorporated herein by reference.

BACKGROUND OF THE INVENTION

Field of the Invention

The present invention relates to an apparatus for folding a battery cell, and more particularly, to an apparatus and method for folding a battery cell, which is capable of folding a sealing part that is sealed by thermal fusion in a pouch, in which an electrode assembly is accommodated.

Description of the Related Art

In recent years, the price of energy sources have risen due to the depletion of fossil fuels, the growing interest in environmental pollution mitigation, and the rising demand for eco-friendly alternative energy sources. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

In particular, in terms of materials, there is a high demand for lithium secondary batteries such as lithium ion batteries and lithium ion polymer batteries having advantages such as high energy density, discharge voltage, and output stability.

The secondary batteries are classified into cylindrical batteries and prismatic batteries, in which an electrode assembly is embedded in a cylindrical or prismatic metal can, and pouch-type batteries, in which an electrode assembly is embedded in a pouch provided as an aluminum laminate sheet according to shapes of battery cases.

Figure 1:
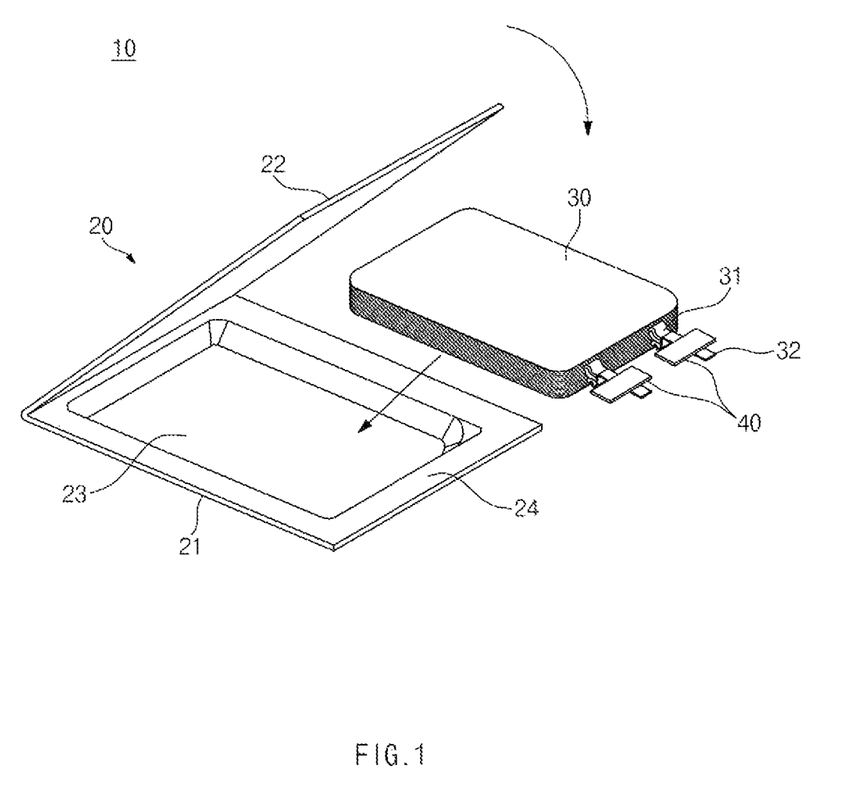
FIG. 1 is a perspective view illustrating an example of a pouch-type secondary battery.

FIG. 1 is a perspective view illustrating an example of a battery cell.

Referring to FIG. 1, a battery cell 10 may include an electrode assembly 30, in which a plurality of electrodes and separators are alternately stacked, and a pouch 20 accommodating the electrode assembly 30. That is, the battery cell 10 may be a pouch-type secondary battery.

The electrode assembly 30 may include a plurality of tabs 31 extending from the plurality of electrodes and an electrode lead 32 bonded to the plurality of tabs 31. The electrode lead 32 may protrude to the outside of the pouch 20 and may be easily electrically connected to a power supply target (e.g., a motor, etc.).

The pouch 20 may include a pouch body 21 having a concave accommodation part 23, in which the electrode assembly 30 is seated, and a pouch cover 22 bonded to the pouch body 21 to seal the accommodation part 23. Before the electrode assembly 30 is accommodated, the pouch body 21 and the pouch cover 22 may be integrally connected or be provided in a state of being separated from each other. In addition, a sub-accommodation part (not shown) having a concave shape corresponding to the accommodation part 23 may be formed in the pouch cover 22.

Also, the pouch body 21 may include a side 24 facing the pouch cover 22 and disposed outside the accommodation part 23, and at least a portion of the side 24 may be bonded to the pouch cover 22 by thermal fusion. That is, the sealing part of the pouch 20 may be formed by allowing at least a portion of the side 24 to be thermally fused to the pouch cover 22.

In order to prevent the electrode lead 32 from being short-circuited while the sealing part is sealed, and to secure sealing properties between the electrode lead 32 and the pouch 20, a lead film 40 may be attached to each of both surfaces of the electrode lead 32.

A method for manufacturing such a battery cell 10 may include, after an electrode assembly is accommodated in a pouch 20, and an electrolyte is injected, a sealing process of thermally fusing a pouch cover 22 to a pouch cover 22 to form a sealing part and a folding process of folding the sealing part to be in close contact with a sidewall of the accommodation part 23.

Due to the folding process, a space occupied by the pouch-type secondary battery may be reduced, and a battery module formed by stacking the plurality of pouch-type secondary batteries may increase in energy density.

However, the pouch-type secondary battery according to the related art has a limitation in that the sealing part folded in the folding process is restored as time goes on.

SUMMARY OF THE INVENTION

An aspect of the present invention provides a folding apparatus and method, which are capable of preventing spring back of a sealing part of a battery cell from occurring after being folded.

According to an aspect of the present invention, there is provided an apparatus for folding a sealing part of a pouch-type battery cell. The apparatus may include: a base configured to contact an accommodation part of a battery cell; a guide protruding upward from opposite sides of the base to surround the accommodation part at opposite sides of the accommodation part; a pressing member configured to press a sealing part of the battery cell to fold the sealing part toward outer surfaces of the guide to form a folded sealing part; a heating member configured to heat the sealing part when the pressing member presses the sealing part; and a cooling member configured to inject cold air to the folded sealing part.

The cooling member may include a vortex tube.

The cooling member may include: an extension part extending along the sealing part; and a plurality of openings disposed along the extension part.

The cooling member may inject the cold air at an inclined angle with respect to the folded sealing part.

The cooling member may inject the cold air toward a lower portion of the folded sealing part.

According to an aspect of the present invention, there is provided a method for folding a sealing part of a pouch-type battery cell. The method may include: placing a battery cell on a base such that an accommodation part of the battery cell is disposed between a pair of guides extending from opposite sides of the base; heating a sealing part of the battery cell while folding the sealing part toward outer surfaces of the guides to form a folded sealing part; and injecting cold air from a cooling member to the folded sealing part, the cooling member being away from the folded sealing part.

The step of injecting cold air may include injecting cold air from the cooling member to the folded sealing part when each of the guides are not disposed between a sidewall of the accommodation part and the folded sealing part.

The step of heating the sealing part may include folding the sealing part at a predetermined angle and the step of injecting cold air may include the step of folding the sealing part toward a sidewall of the accommodation part.

The step of injecting cold air may include injecting cold air from the cooling member at an inclined angled with respect to the folded sealing part.

The step of injecting cold air may include injecting the cold air from the cooling member toward a lower portion of the folded sealing part.

The step of heating the sealing part may include heating a surface of the sealing part to a first temperature of about 150° C. to 200° C., and the step of injecting cold air may include cooling the surface to a second temperature of about 60° C. to 80° C.

A time taken to cool the surface of the folded sealing part from the first temperature to the second temperature may be about 2 seconds or less.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Figure 2:
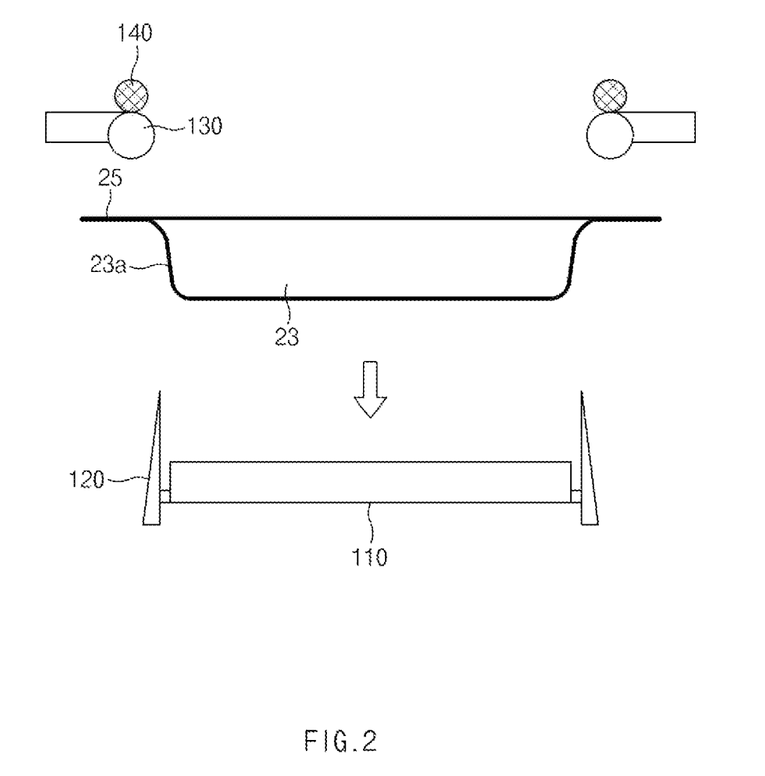
FIG. 2 is a schematic view illustrating an apparatus for folding a battery cell according to an embodiment of the present invention.
Figure 3:
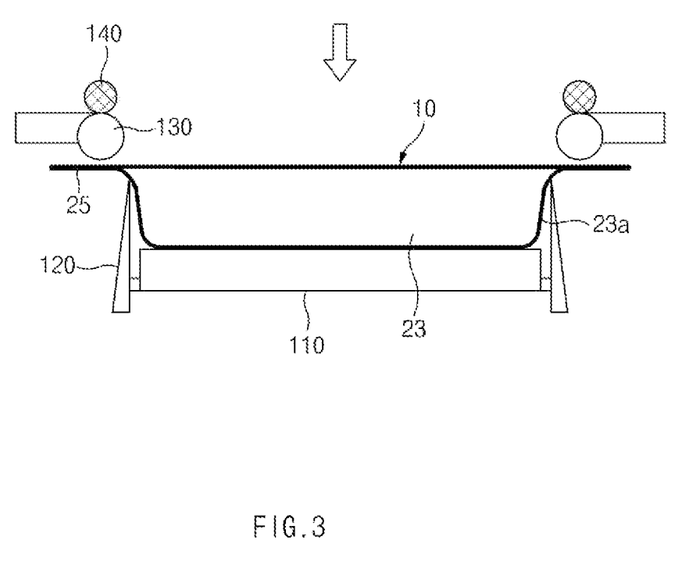
FIG. 3 is a schematic view showing a step of an operation to fold the battery cell using the apparatus of FIG. 2 according to an embodiment of the present invention.
Figure 4:
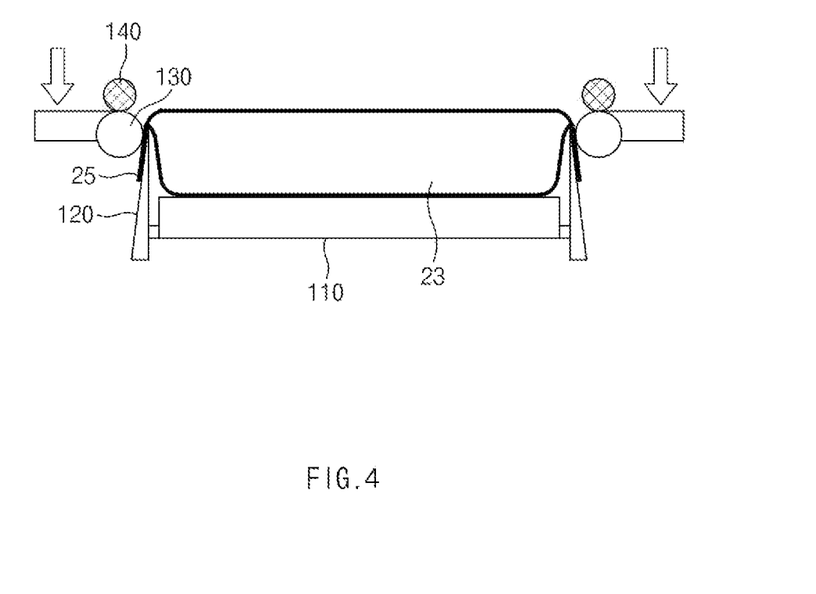
FIG. 4 is a schematic view showing another step of the operation to fold the battery cell using the apparatus of FIG. 2 according to an embodiment of the present invention.
Figure 5:
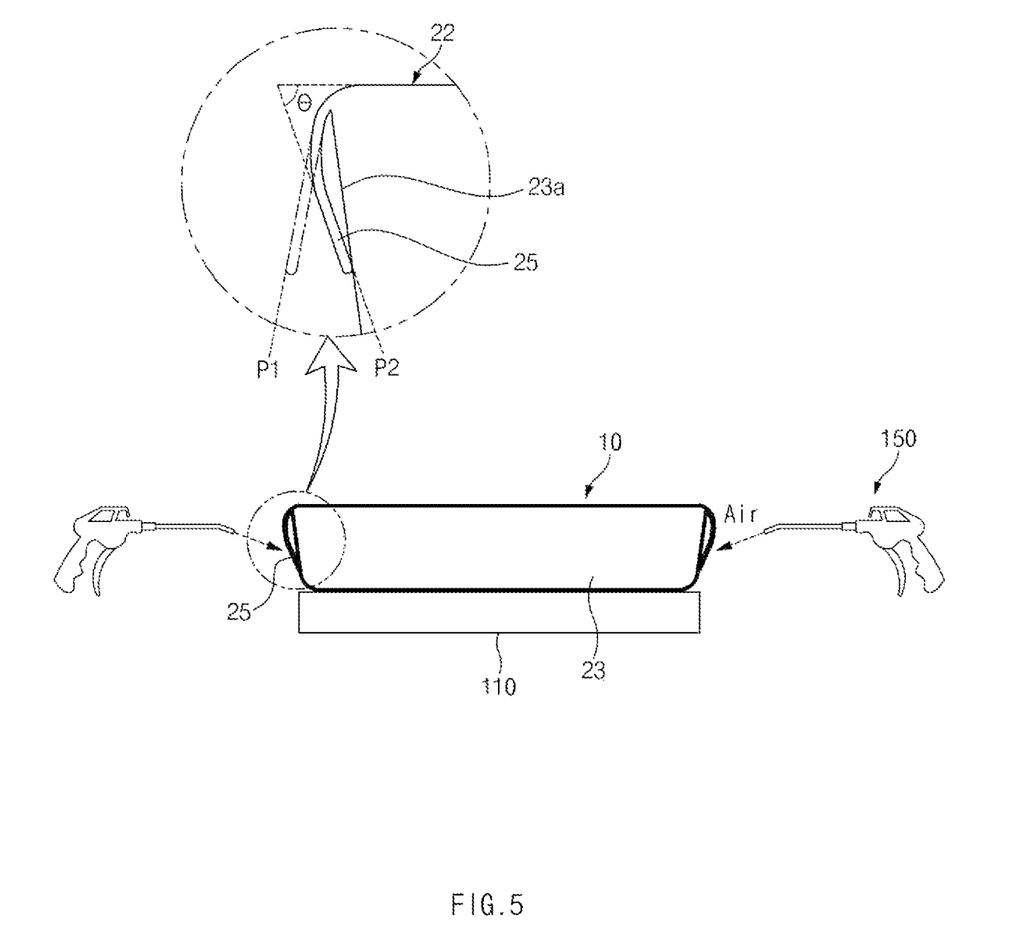
FIG. 5 is a schematic view showing another step of the operation to fold the battery cell using the apparatus of FIG. 2 according to an embodiment of the present invention.

FIG. 2 is a schematic view illustrating an apparatus for folding a battery cell according to an embodiment of the present invention, and FIGS. 3 to 5 are schematic views for explaining an operation of the apparatus for folding the battery cell according to an embodiment of the present invention.

An apparatus for folding a battery cell according to an embodiment of the present invention may fold a sealing part 25 of the battery cell 10 and minimize spring back of a sealing part 25 as time goes on.

A pouch 20 of the battery cell 10 may include a resin layer made of polypropylene (PP) or polyethylene (PE). The resin layer may decrease in crystallinity as a temperature increases and may increase in crystallinity as the temperature decrease.

Thus, when a heating member 140 to be described later heats the sealing part 25, the crystallinity of the resin layer may decrease to increase moldability of the sealing part 25, and the sealing part 25 may be smoothly folded by a pressing member 130. In addition, when a cooling member 150 to be described later cools the sealing part 25, the crystallinity of the resin layer may increase so that the sealing part 25 is hardened in the folded state.

In more detail, the apparatus for folding the battery cell may include a base 110, a guide 120, the pressing member 130, the heating member 140, and the cooling member 150.

In the base 110, the battery cell 10, more specifically, the accommodation part 23 of the pouch 20 may be seated. That is, the base 110 may support the accommodation part 23 from a lower side. The base 110 may have a horizontal plate shape, but is not limited thereto.

The base 110 may be transferred by a transfer part (not shown) such as a conveyor belt.

The guide 120 may protrude upward from each of both sides of the base 110 and may be provided in a pair, which are spaced apart from each other in a horizontal direction. A distance between the pair of guides 120 may correspond to a width of the base 110.

Each of the guides 120 may be approximately erected vertically and may have a plate shape that is elongated in a longitudinal direction of the sealing part 25 of the battery cell 10, but is not limited thereto.

The guide 120 may wrap the accommodation part 23 of the battery cell 10 from both sides. In more detail, inner surfaces of the pair of guides 120 may face both sidewalls 23a of the accommodation part 23, respectively.

In addition, the upper end of the guide 120 may be in contact with a connection part between the accommodation part 23 and the sealing part 25 of the battery cell 10 or may be adjacent to the connection part. Thus, the sealing part 25 of the battery cell 10 seated on the base 110 may not interfere with the guide 120.

The pressing member 130 may press the sealing part 25 of the battery cell 10 to fold the sealing part 25. In more detail, the pressing member 130 may descend from an upper side of the sealing part 25 to fold the sealing part 25 toward an outer surface of the guide 120. Thus, the sealing part 25 may be folded to be in close contact with the outer surface of the guide 120.

For example, the pressing member 130 may include an elevation body that moves vertically and a roller that is rotatably connected to the elevation body to press the sealing part 25. The roller may be formed to be elongated in the longitudinal direction of the sealing part 25.

The heating member 140 may heat the sealing part 25 when the pressing member 130 presses the sealing part 25. That is, the heating member 140 may perform heat-folding of the sealing part 25 together with the pressing member 130.

The heating member 140 may be provided on the pressing member 130 and may be elevated together with the pressing member 130.

For example, the heating member 140 may be a heating bar provided on the pressing member 130 and formed to be elongated in the longitudinal direction of the sealing part 25. However, the present invention is not limited thereto, and the heating member 140 may be a heating coil embedded in the pressing member 140.

The cooling member 150 may inject cold air to the sealing part 25 that is in the folded state. The cooling member 150 may rapidly cool the sealing part 25 in a non-contact manner.

The cooling member 150 may include a vortex tube or a cold jet. However, the present invention is not limited thereto, and the cooling member may be provided as an air-gun or the like.

At least one pair of cooling members 150 spaced apart from each other in a horizontal direction may be provided. Hereinafter, a case in which the pair of cooling members 150 are provided will be described as an example.

A distance between the pair of cooling members 150 may be greater than the width of the battery cell 10 in which the sealing part 25 is folded. Thus, the battery cell 10 may be disposed between the pair of cooling members 150.

When the sealing part 25 is heat-folded by the pressing member 130 and the heating member 140 in advance, the guide 120 may be disposed between a sidewall 23a of the accommodation part 23 and the sealing part 25. Thus, the sealing part 25 may be folded in a shape that is in close contact with the outer surface of the guide 120 without being completely folded toward the sidewall 23a of the accommodation part 23.

On the other hand, the cooling member 150 may cool the sealing part 25 in a state in which the guide 120 is separated between the sidewall 23a of the accommodation part 23 and the sealing part 25. Thus, the sealing part 25 may be further folded toward the sidewall 23a of the accommodation part 23 by being pressed by the cold air injected from the cooling member 150.

In more detail, the sealing part 25 may be folded from an initial horizontal position up to a first angle P1 by the pressing member 130 and the heating member 140 and then may be further folded up to a second angle P2 by the cooling member 150.

The sealing part 25 folded at the first angle P1 may be vertical or may face an inclined direction that is away from the sidewall 23a of the accommodation part 23 downward. In this case, an end of the sealing part 25 may be spaced apart from the sidewall 23a of the accommodation part 23.

The sealing part 25 folded at the second angle P2 may face an inclined direction toward the sidewall 23a of the accommodation part 23 downward. In this case, the end of the sealing part 25 may be in contact with or adjacent to the sidewall 23a of the accommodation part 23.

When the cold air injected from the cooling member 150 flows into the space between the sidewall 23a of the accommodation part 23 and the sealing part 25, there is a risk of unfolding in which the sealing part 25 is unfolded. In order to prevent such a concern, the cooling member 150 may be configured to inject the cold air in the inclined direction in which a height is lowered as gradually approaching the sealing part 25 in the folded state. That is, the cooling member 150 may inject the cold air in the inclined direction between the horizontal direction and the downward direction. Alternatively, the cooling member 150 may inject the cold air in the horizontal direction.

Also, the cooling member 150 may inject the cold air toward a lower portion of the sealing part 25. Thus, when compared to the case in which the cold air presses an upper part of the sealing part 25, since torque acting on the sealing part 25 increases, the sealing part 25 may be smoothly folded even at a weak injection pressure.

Figure 6:
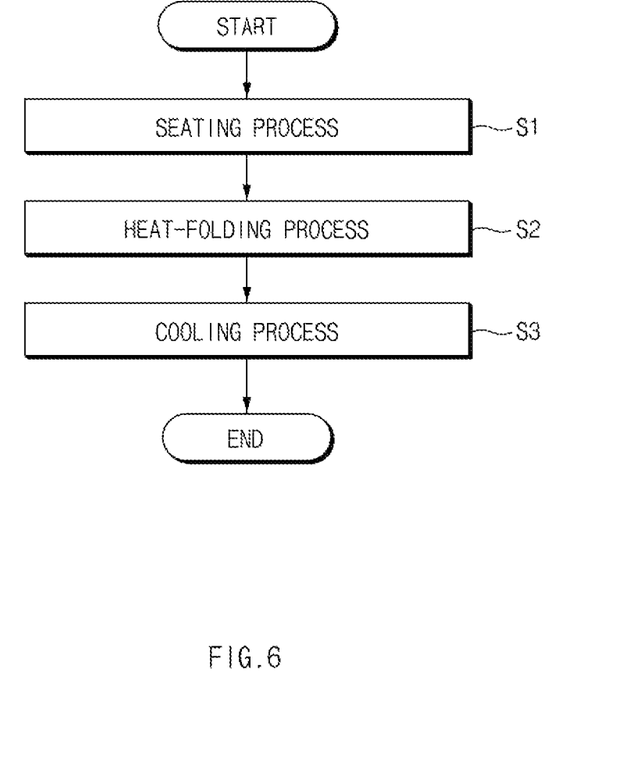
FIG. 6 is a flowchart illustrating a method for folding a battery cell according to an embodiment of the present invention.

FIG. 6 is a flowchart illustrating a method for folding a battery cell according to an embodiment of the present invention.

A method for folding a battery cell according to this embodiment may include a seating process (S1), a heat-folding process (S2), and a cooling process (S3).

The seating process (S1) may be a process of seating the battery cell 10 on a base 110. In this case, a pair of guides 120 may wrap an accommodation part 23 of the battery cell 10 from both sides.

In more detail, the base 110 may move between the pair of guides 120 in the state in which the battery cell 10 is seated, or the battery cell 10 may be seated on the base 110 in the state in which the base is disposed between the pair of guides 120.

The heat folding process (S2) may be a process of heating a sealing part 25 of the battery cell 10 while folding the sealing part 25 toward an outer surface of each of the guides 120.

In more detail, the pressing member 130 may descend to press the sealing part 25, which is in a horizontal state, downward so as to fold the sealing part 25, and the heating member 140 may descend together with the pressing member 130 to heat the sealing part 25. In more detail, a surface of the sealing part 25 may be heated to a high temperature of about 150° C. to about 200° C., preferably about 170° C. to about 190° C. As a result, moldability of the sealing part 25 may increase so that folding is performed smoothly.

Also, in the heat folding process (S2), the sealing part 25 may be folded at a first angle P1 (see FIG. 5) corresponding to the outer surface of the guide 120. The sealing part 25 folded at the first angle P1 may be vertical or may face an inclined direction that is away from the sidewall 23a of the accommodation part 23 downward, and an end of the sealing part 25 may be spaced apart from the sidewall 23a of the accommodation part 23.

The cooling process (S3) may be a process of allowing a cooling member to inject cold air to the sealing part 25 in a non-contact state.

In more detail, after the sealing part 25 is folded by the pressing member 130 and the heating member 140, the battery cell 10 may move between the pair of cooling members 150 in the state of being seated on the base 110. Thus, the cooling process S3 may be performed in a state in which the guide 120 is separated between each of both the sidewalls 23a of the accommodation part 23 and the sealing part 25.

As described above, the cooling member 150 may inject the cold air in a direction in which a height decreases as gradually approaching the sealing part 25 and also may inject the cold air toward a lower portion of the sealing part 25.

In the cooling process (S3), the surface of the sealing part 25 may be cooled to a low temperature of about 60° C. to about 80° C., and a time taken to cool the sealing part 25, which is in a high temperature state, up to a low temperature may be within about 2 seconds. Thus, a working time may be shortened, and spring back of the sealing part 25 may be suppressed more effectively due to the rapid cooling.

In addition, in the cooling process (S3), the sealing part 25 may be folded at a second angle P2 (see FIG. 5), which is closer to the sidewall 23a of the accommodation part 23 than at the first angle P1, by a pressure of the cold air. The sealing part 25 folded at the second angle P2 may face the inclined direction that is away from the sidewall 23a of the accommodation part 23 downward, and the end of the sealing part 25 may be in contact with or adjacent to the sidewall 23a of the accommodation part 23.

Therefore, finally, an angle θ defined by the sealing part 25 and a top surface of the battery cell 10, that is, a pouch cover 22 may be an acute angle. Thus, since a space occupied by the battery cells 10 is further reduced, energy density of a battery module manufactured by stacking a plurality of battery cells 10 may increase.

Figure 7:
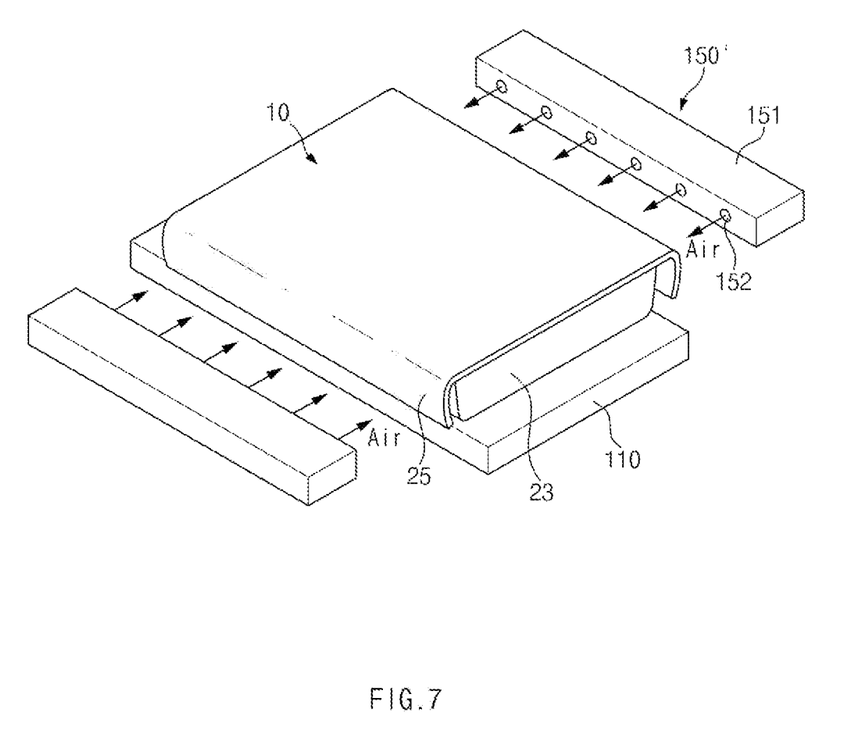
FIG. 7 is a schematic view illustrating a cooling member according to another embodiment of the present invention.

FIG. 7 is a view illustrating a cooling member according to another embodiment of the present invention.

Hereinafter, the foregoing contents may be cited except for detailed configurations of a cooling member 150', and differences will be mainly described.

The cooling member 150' according to this embodiment may include an extension part 151 extending in parallel with a sealing part 25 of a battery cell 10, and a plurality of injection parts 152 disposed along the extension part 151.

The extension part 151 may have a bar shape extending in a longitudinal direction of the sealing part 25. A length of the extension part 151 may be greater than or equal to that of the sealing part 25.

The plurality of injection parts 152 may be spaced a predetermined distance from each other in a longitudinal direction of the extension part 151. Each of the injection parts 152 may have a hole or nozzle shape, but is not limited thereto. Cold air may be simultaneously injected from the plurality of injection parts 152.

For example, a pump (not shown) disposed outside the extension part 151 may introduce the cold air into the extension part 151, and the cold air may be divided into the plurality of injection parts 152 and then injected. However, the present invention is not limited thereto, and the pump may be disposed inside the extension part 151.

Due to the configuration of the cooling member 150', the sealing part 25 may be uniformly cooled and folded in the longitudinal direction.

According to the embodiment of the present invention, the cooling member may cool the heat-folded sealing part. Thus, the spring back of the folded sealing part may be minimized as time goes on.

In addition, the sealing part may be more folded to the sidewall of the accommodation part by the pressure of the cold air. Thus, even though the battery module including the plurality of battery cells increases in energy density, and the spring back of the sealing part is performed somewhat, it may be maintained within the design margin.

In addition, since the sealing part is cooled through the non-contact manner, in which the cold air is injected, the separate guide may be unnecessary during the cooling.

In addition, since the sealing part is cooled through the non-contact manner, in which the cold air is injected, the sealing part may be cooled while transferring the battery cell. Thus, the time required for the process of manufacturing the battery cell may be reduced, and the process of cooling the plurality of battery cells may be continuously performed.

In addition, the cooling member may inject the cold air in the inclined direction, in which a height is lowered as gradually approaching the sealing part. Thus, the cold air may be injected between the sidewall of the accommodation part and the sealing part to prevent the sealing part from being spread.

In addition, the cooling member may inject the cold air toward the lower portion of the sealing part. Thus, even though the pressure of the cold air is low somewhat, the sealing part may be smoothly folded toward the sidewall of the accommodation part.

In addition, in the cooling process, the surface of the sealing part may be cooled from the high temperature to the low temperature within about two seconds. Thus, the working time may be reduced, and the spring-back prevention effect of the sealing part may be improved.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being included in the present invention.

What is claimed is:

1. An apparatus for folding a sealing part of a pouch-type battery cell, the apparatus comprising:
    a base configured to contact an accommodation part of a battery cell in a first position;
    a guide protruding upward from opposite sides of the base to surround the accommodation part at opposite sides of the accommodation part;
    a pressing member configured to press a sealing part of the battery cell to fold the sealing part toward outer surfaces of the guide to form a folded sealing part;
    a heating member configured to heat the sealing part when the pressing member presses the sealing part;
    a transfer member configured to move the base with the battery cell from the first position to a second position where the guide is removed from between a sidewall of the accommodation part and the folded sealing part, and
    a cooling member configured to inject cold air to the folded sealing part in the second position, wherein the injected cold air from the cooling member is directed toward a lower portion of the folded sealing part at an inclined angle to press and further fold the sealing part from a first angle to a second angle in contact with or adjacent to the sidewall of the accommodation part,
    wherein the cooling member is positioned in a non-contact arrangement with the folded sealing part such that the cooling member does not engage the folded sealing part during cooling.

2. The apparatus of claim 1, wherein the cooling member comprises a vortex tube.

3. The apparatus of claim 1, wherein the cooling member comprises:
an extension part extending along the sealing part; and
a plurality of openings disposed along the extension part.

4. The apparatus of claim 1, wherein the cooling member injects the cold air at an inclined angle with respect to the folded sealing part, the cold air being configured to decrease in height approaching the folded sealing part and being oriented to avoid directing air into a gap between the sealing part and the sidewall to prevent unfolding of the sealing part.

5. The apparatus of claim 1, wherein the cooling member injects the cold air toward a lower portion of the folded sealing part such that a torque generated by the cold air further folds the sealing part from the first angle to the second angle.

6. The apparatus of claim 1, wherein the sealing part is folded by the pressing member and the heating member to the first angle substantially matching an outer surface of the guide before the guide is removed.

7. The apparatus of claim 6, wherein the first angle is substantially vertical or inclined away from the sidewall of the accommodation part.

8. The apparatus of claim 1, wherein the second angle is an acute angle defined between the sealing part and a top surface of the pouch-type battery cell.

9. The apparatus of claim 1, wherein the cooling member cools the sealing part from a first temperature of about 150° C. to 200° C. to a second temperature of about 60° C. to 80° C.

10. The apparatus of claim 9, wherein a time taken to cool the sealing part from the first temperature to the second temperature is about 2 seconds or less.

11. The apparatus of claim 1, wherein the cooling member includes at least one pair of cooling members disposed on opposite sides of the battery cell and spaced apart by a distance greater than a width of the folded sealing part.

12. The apparatus of claim 1, wherein the cooling member is configured to inject cold air while the battery cell is being conveyed along a transfer path.

* * * * *